United States Patent [19]
Oda et al.

[11] Patent Number: 5,121,605
[45] Date of Patent: Jun. 16, 1992

[54] TURBO-CHARGER WITH ROTARY MACHINE

[75] Inventors: Keiji Oda; Shigeki Saito, Katsuta, both of Japan

[73] Assignee: Hitachi, Ltd, Ibaraki, Japan

[21] Appl. No.: 492,068

[22] Filed: Mar. 12, 1990

[30] Foreign Application Priority Data

Mar. 14, 1989 [JP] Japan .................. 1-059693

[51] Int. Cl.⁵ .................. F02B 33/44; H02R 21/12
[52] U.S. Cl. .................. 60/608; 310/156;
310/261; 417/423.7; 290/52
[58] Field of Search .................. 60/608; 310/156, 90,
310/261; 417/407, 423.7; 290/52

[56] References Cited

U.S. PATENT DOCUMENTS

| | | |
|---|---|---|
| 2,704,231 | 3/1955 | Goldsmith et al. |
| 2,824,520 | 2/1958 | Bartels .................. 417/423.7 |
| 4,072,370 | 2/1978 | Wasson . |
| 4,253,031 | 2/1981 | Frister .................. 290/52 |
| 4,355,850 | 10/1982 | Okano .................. 417/407 |
| 4,586,878 | 5/1986 | Witchger .................. 417/407 |
| 4,694,654 | 9/1987 | Kawamura .................. 310/156 |
| 4,695,754 | 9/1987 | Popov et al. .................. 310/156 |
| 4,748,359 | 5/1988 | Yahara et al. .................. 310/156 |
| 4,827,170 | 5/1989 | Kanamura et al. .................. 60/608 |
| 4,864,174 | 9/1989 | Kawamura et al. .................. 310/261 |
| 4,884,406 | 12/1989 | Kawamura .................. 60/608 |
| 4,910,861 | 3/1990 | Dohogne .................. 310/156 |
| 4,924,674 | 5/1990 | Hara et al. .................. 60/608 |
| 4,954,736 | 9/1990 | Kawamoto et al. .................. 310/156 |

FOREIGN PATENT DOCUMENTS 1144222 10/1957 France .

*Primary Examiner*—Richard A. Bertsch
*Assistant Examiner*—Michael I. Kocharov
*Attorney, Agent, or Firm*—Antonelli, Terry, Stout & Kraus

[57] ABSTRACT

A turbo-charger with a rotor directly connected thereto has a turbine impeller, a turbine shaft secured to the turbine impeller and a compressor secured to the turbine shaft and driven thereby to forcibly feed air into an internal combustion engine. The rotor is provided on the turbine shaft and so structured as to prevent the occurrence of an unbalanced condition during rotation of the turbine shaft.

13 Claims, 10 Drawing Sheets

TURBO-CHARGER WITH ROTARY MACHINE

BACKGROUND OF THE INVENTION

The present invention relates to a turbo-charger with a rotary machine to be rotated at a high speed.

In recent years, it has become practical to equip internal combustion engines with turbo-chargers each having a turbine rotatable by engine exhaust gases to compress engine intake air to supercharge an engine. It has also been thought of to utilize the thermal energy of engine exhaust gases to produce supercharging air as well as to generate an electric power. More specifically, a device is thought of which includes a turbo-charger having a turbine shaft connected with not only a compressor but also a rotor which is formed by a permanent magnet capable of withstanding magnetic reduction at a high temperature. The device also includes a stator disposed around the rotor with a predetermined gap formed therebetween. An example of such device is disclosed in U.S. Pat. No. 4,253,031.

It is also proposed that, in the case where the thermal energy possessed by engine exhaust gases is so high that the power generated by a turbo-charger turbine cannot be fully spent by a supercharging compressor, the surplus thermal energy is utilized to drive a rotary machine formed by a rotor and a stator to cause the machine to generate an electric power and that, in the case where the thermal energy of the engine exhaust gases is so low that the power generated by the turbine is insufficient to drive the supercharging compressor, the rotary machine is electrically energized by an electric power source to cause the machine to act as an electric motor. This art is disclosed in, for example, Japanese Unexamined Patent Publication No. 62-254649.

Such turbo-chargers are, in general, rotated at a super high speed. Thus, when a dynamic unbalance is caused in the rotor of the rotary machine on a turbo-charger during a high speed operation thereof, there is a possibility that the turbine shaft suffers from a bending vibration which would cause a resonance resulting in a breakdown as a whole, of the turbo-charger.

SUMMARY OF THE INVENTION

Under the circumstance discussed above, an objective according to the present invention is to provide a turbo-charger of the class specified above and having a structure which enables the rotor to withstand a super high speed rotation.

In order to achieve the above objective, the present invention provides an improvement in turbo-chargers which have been known per se.

DESCRIPTION OF PREFERRED EMBODIMENTS

Figure 1:
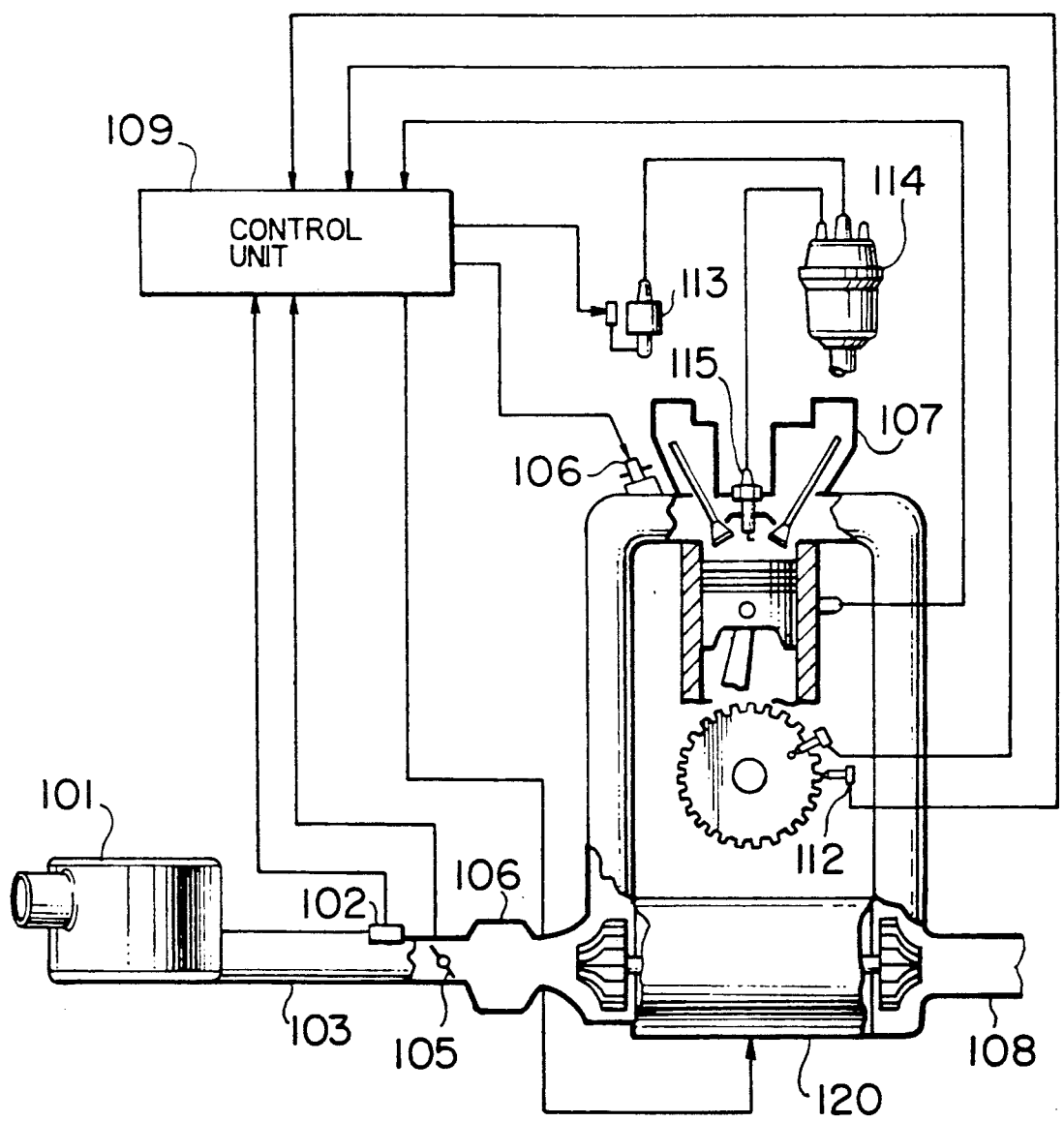
FIG. 1 diagrammatically illustrates a supercharged internal combustion engine.

Referring to FIG. 1 which diagrammatically illustrates a turbo-charged internal combustion engine 107, an engine intake air is suctioned through an air inlet of an air cleaner 101 and flows through a duct 103, a throttle body having a throttle valve 105 and through an intake manifold 106 into engine cylinders. The quantity of the engine intake air is detected by a heat wire type air flow meter 102 mounted on the duct 103 to generate a signal which is input into a control unit 109.

On the other hand, a fuel is supplied from a fuel tank, not shown, and injected through an injector 116 into an intake air passage in which the injected fuel is mixed with the intake air to form an air-fuel mixture which is then fed into engine cylinders only one of which is shown in FIG. 1. The mixture is compressed in each cylinder and ignited therein by an ignition plug 115 to produce a combustion gas which is exhausted through an exhaust pipe 108. An exhaust gas sensor, not shown, is mounted on the exhaust pipe 108 to generate a signal which is also input into the control unit 109.

An ignition coil 113 generates a high voltage current which is distributed by a distributor 114 to ignition plugs 115 associated with respective cylinders. The conditions of the engine rotation are detected by a crank angle sensor 112 which generates a signal per predetermined angles of the crank shaft rotation. The crank angle signals are also fed into the control unit 109. The engine 107 is provided with a vibration sensor which also generates a vibration signal also input into the control unit 109.

The control unit 109 computes the supply of fuel to the engine, the ignition timing and so forth on the basis of the signals from respective sensors and generates control signals fed to engine controlling actuators.

Figure 2:
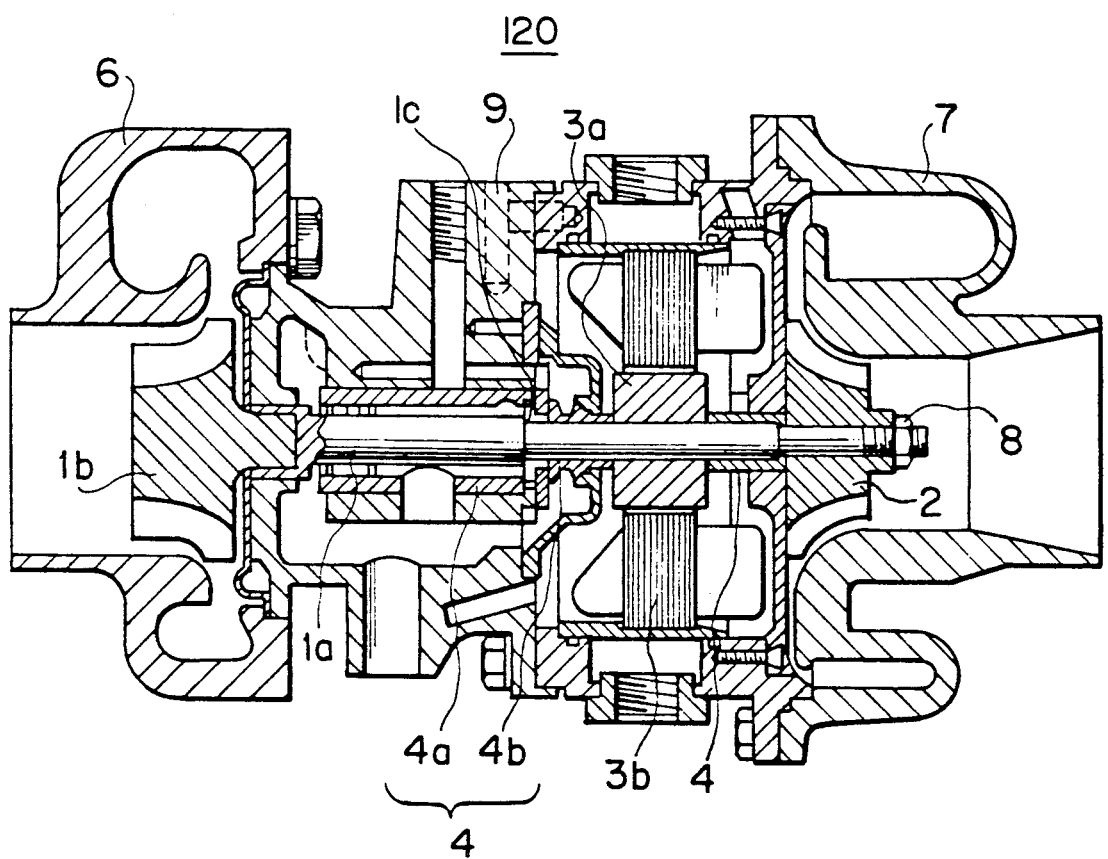
FIG. 2 is an axial sectional view of an embodiment of a turbo-charger equipped with a rotary machine.

The engine is further equipped with a turbo-charger 120 operable by the energy of the engine exhaust gases to supercharge the engine. The turbo-charger 120 is provided with a rotary machine directly connected thereto. An example of the rotary machine is shown in FIG. 2.

The turbo-charger 120 includes a turbine impeller 1b to be rotated by the engine exhaust gases. The impeller 1b is disposed in a turbine casing 6 and fixed to a turbine shaft 1a. A compressor impeller 2 is disposed in a compressor casing 7 and fixed to the turbine shaft 1a for rotation thereby to forcibly feed air into the engine.

The turbine shaft 1a carries thereon a thrust bearing 4b, a collar 4, a permanent magnet rotor 3a and the above-mentioned compressor impeller 2. These component parts are fixed to the turbine shaft and fastened between a stepped portion 1c of the shaft and a nut 8 thereon. The turbine shaft 1a is supported by a center housing 9 with a radial bearing 4a interposed therebetween.

The rotary machine connected directly to the turbocharger of this embodiment is formed by the permanent magnet rotor 3a and a stator 3b.

Because turbo-chargers in general are rotated at super high speeds, rotors directly connected to turbochargers are subjected to large centrifugal forces. In order that the rotors may withstand rotations at super high speeds, therefore, the rotors should preferably be designed to be as small and light as possible. From this point of view, the air gap between the rotor 3a and the stator 3b is determined to be as small as possible, i.e., 0.5 mm, for example.

The stator 3b has three-phase windings (not shown), while the rotor 3a is made of a permanent magnet which is strong and highly durable against magnetic reduction at a high temperature, such as samarium cobalt magnet.

As such, the rotor 3a and the stator 3b cooperate together to form a three-phase rotary machine. When the energy of the exhaust gases of the internal combustion engine equipped with the thus structured turbocharger is so high that the power generated by the turbine impeller 1b is more than enough to drive the compressor impeller 2, a part of the power is utilized to operate the three-phase rotary machine as a generator so that a part of the engine exhaust gases can be collected in the form of an electric power.

On the other hand, if the energy of the engine exhaust gases is so low that the power generated by the turbine impeller 1b is insufficient to drive the compressor impeller 2, the three phase rotary machine may be energized by an external electric power and operated as an electric motor to drive the compressor impeller 2.

The permanent magnet should be so mounted on the shaft that the magnet does not rotate relative to the shaft. In order to bear the centrifugal force of the permanent magnet, a fixing tube may be fitted over the outer periphery of the permanent magnet and secured thereto by an adhesive. A fiber-reinforced plastic material may be substituted for the fixing tube. However, a further consideration should be made to prevent the fixing tube from being deformed by centrifugal force and to prevent the permanent magnet from being broken due to such centrifugal deformation of the fixing tube.

During engine operations at rated speeds, there are many times when turbo-chargers are rotated at speeds higher than 100,000 r/min. However, magnetic materials in general have relatively low mechanical strengths and would possibly be broken by centrifugal force. In order to bear the centrifugal force to prevent breakage of the permanent magnet of the rotor, it is insufficient to simply fit a cylindrical reinforcement member onto the permanent magnet because the cylindrical reinforcement member would become outwardly deformed by the centrifugal force. After the reinforcement member becomes thus deformed, the reinforcement member will no longer be operative to provide inwardly directioned (as radial) support the permanent magnet, resulting in a breakdown of the permanent magnet.

In order to prevent such breakdown of the permanent magnet, it is necessary to increase the rigity of the cylindrical reinforcement member fitted over the shaft to assure that the reinforcement member can withstand a centrifugal force generated by a super high speed rotation.

When an axial end plate is provided in addition to such cylindrical reinforcement member, the end plate is less liable to be centrifugally deformed than the cylindrical reinforcement member. Thus, by an axial end plate provided to cover an end face of a cylindrical permanent magnet, it is possible to provide, for example, inwardly directioned (or radial) support of the outer periphery of an open end of a cylindrical reinforcement member fitted onto the cylindrical permanent magnet. For this purpose, the cylindrical reinforcement member and the axial end plate may be provided with mutually fitting or engaging portions. When the cylindrical reinforcement member and the axial end plate are so engaged with each other that the outer periphery of the open end of the cylindrical reinforcement member is inwardly supported, the occurrence of the centrifugal deformation of the cylindrical reinforcement member can be greatly suppressed to enable the reinforcement member to be liable to withstand a super high speed rotation.

It is also possible to reinforce a cylindrical permanent magnet by longer and shorter cylindrical reinforcement members each having an integral bottom or end wall covering an end face of the cylindrical magnet and arranged such that the outer periphery of the open end of the longer reinforcement member is engaged and inwardly supported by the open end of the shorter reinforcement member. The engagement between the open ends of the longer and shorter cylindrical reinforcement members may preferably be in the form of socket and spigot joint that can provide a substantially smooth and continuous outer peripheral surface.

The end walls of the longer and shorter cylindrical reinforcement members can act as end plates integral with the cylindrical peripheral walls thereof. The portions of the reinforcement members adjacent the end walls are restrained by the end walls and, thus, are capable of withstanding the centrifugal forces. Comparing the longer and shorter cylindrical reinforcement members in respect of the centrifugal deformation, therefore, the shorter cylindrical member is less liable to be centrifugally deformed than the longer member. Accordingly, by inwardly supporting the outer periphery of the longer cylindrical reinforcement member by means of the shorter cylindrical reinforcement member, it is possible to greatly suppress the occurrence of a centrifugal deformation of the longer cylindrical member to assure that the longer member can withstand a super high speed rotation.

In addition, if the junction between the reinforcement members is in the form of the socket and spigot joint, the junction does not produce any step in the outer peripheral surface of the reinforcement members thus fitted or engaged with each other to advantageously assure that the rotor matches well with a radially opposed member and is prevented from becoming dynamically unbalanced.

It is also possible to connect, by welding, an open end of a cylindrical reinforcement member fitted onto a cylindrical permanent magnet to an outer peripheral portion of an axial end plate covering an end of the magnet such that the welding is effected along a circle of a diameter greater than the outer diameter of the cylindrical permanent magnet. Such welding is effective to prevent the cylindrical reinforcement member from being centrifugally deformed. The welding effected along the circle radially outwardly of the outer periphery of the cylindrical permanent magnet does not cause any adverse thermal influence in the permanent magnet which would cause a deterioration the magnetic characteristic of the permanent magnet and tends to produce gases in the permanent magnet to lower the welding strength.

It is also preferred to divide the cylindrical permanent magnet into a plurality of magnet segments along planes passing through the axis of the cylindrical magnet and press-fit the thus divided magnet segments into the cylindrical reinforcement member with the gaps between the magnet segments filled with expansible plastic material. To so divide the cylindrical permanent magnet into a plurality of magnet pieces is effective to reduce the centrifugal stress generated in the cylindrical permanent magnet to thereby more reliably enhance the advantageous result of the present invention. The reason will be described hereunder.

When a cylindrical permanent magnet mounted on a shaft is rotated at a super high speed without any reinforcement member fitted over the magnet, it is possible that the magnet would break into a plurality of pieces because the magnetic steel has a low strength relative to its specific gravity. If the cylindrical permanent magnet is divided beforehand into a plurality of segments and the divided magnet segments are assembled and fitted into a cylindrical reinforcement member, the assembled magnet segments would not break even as a result of centrifugal forces. The centrifugal forces of the magnet segments are borne by the cylindrical reinforcement member surrounding the assembled magnet segments.

While it was known to divide a permanent magnet rotor into a plurality of magnet segments, the cylindrical reinforcement member according to the present invention is constructed to well withstand the centrifugal force to assure that the advantage of dividing the permanent magnet rotor is enhanced.

Figure 3:
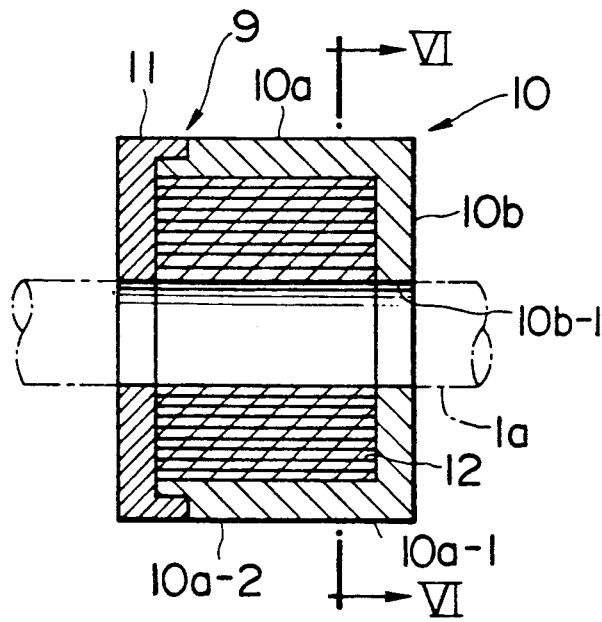
FIGS. 3–5 are axial sectional views of embodiments of a permanent magnet rotor, respectively.

FIG. 3 shows in a sectional view an embodiment of a permanent magnet rotor for use in a rotary machine to be directly connected to a turbo-charger. A cylindrical permanent magnet 12 is fixedly mounted on the shaft 1a and reinforced by a bottomed cylindrical reinforcement member 10 which includes a cylindrical section 10a fitted onto the cylindrical magnet 12 and a circular end wall 10b integral with the cylindrical section and having formed therein a central through-hole 10b-1 through which the shaft 1a extends. A circular end plate 11 having formed therein a through-hole for the shaft 1a closes the open end of the cylindrical section 10a and is connected thereto by means of a socket and spigot joint 9 disposed within the end face of the open end of the cylindrical section 10a. The socket and spigot joint 9 is arranged such that the joint portion of the cylindrical section 10a is inserted into the joint portion of the end plate 11 and fixed thereto by shrinkage-fitting with epoxy resin interposed between the joint portions.

When the thus formed permanent magnet rotor is rotated at a super high speed (higher than 100,000 r/min.), the cylindrical section 10a of the reinforcement member is subjected to a centrifugal force. However, the portion 10a-1 of the cylindrical section 10a adjacent the end wall 10b is restrained by the end wall and thus is not deformed outwardly.

On the other hand, the portion 10a-2 of the cylindrical section 10a adjacent to its open end tends to be outwardly deformed due to the centrifugal force. However, because this portion 10a-2 is radially inwardly restrained by the socket and spigot joint 9, this portion 10a-2 can withstand the high speed rotation.

Figure 4:
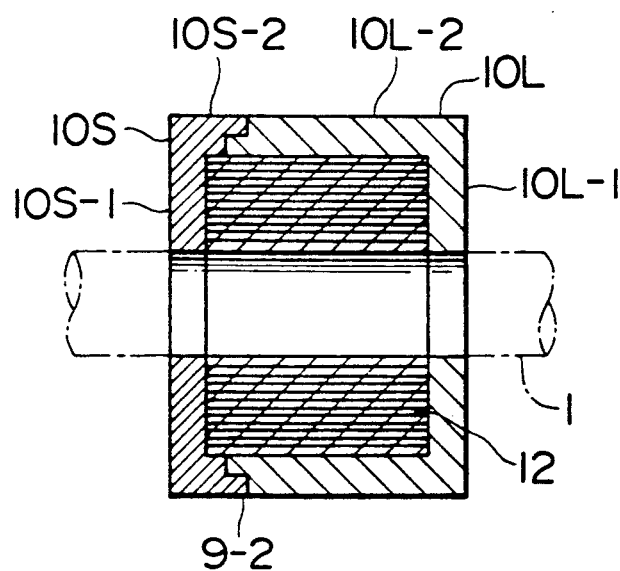

FIG. 4 shows another embodiment in which the cylindrical permanent magnet 12 mounted on the turbine shaft 1 is reinforced by a bottomed and longer cylindrical reinforcement member 10L including a bottom wall 10L-1 closing one end face of the cylindrical magnet 12 and a cylindrical section 10L-2 integral with the bottom wall 10L-1 and fitted onto a part of the outer periphery of the cylindrical magnet 12. The cylindrical magnet 12 is also reinforced by a bottomed shorter cylindrical reinforcement member 10S including a second end wall 10S-1 closing the other end face of the cylindrical magnet 12 and a cylindrical section 10S-2 integral with the end wall 10S-1 and fitted over the rest of the outer periphery of the cylindrical magnet 12. The open ends of the longer and shorter cylindrical reinforcement members 10L and 10S are connected together by means of a socket and spigot joint 9-2 similar to the joint 9 shown in FIG. 3 to assure that the shorter reinforcement member 10S prevents the open end of the longer reinforcement member 10L from being outwardly deformed by centrifugal force.

The words "longer" and "shorter" are used herein to mean the relative lengths of the two reinforcement members 10L and 10S. Specific dimensions of these reinforcement members can be appropriately determined.

The two cylindrical reinforcement members 10L and 10S of this embodiment have integral end walls 10L-1 and 10S-1, respectively. When the cylindrical magnet 12 is assembled with these reinforcement members, the joint portions of the two reinforcement members are first separated from each other and, then, the cylindrical magnet 12 is assembled with the reinforcement members and, thereafter, the two reinforcement members 10L and 10S are connected together with epoxy resin applied to the joint portions of the reinforcement members.

Figure 5:
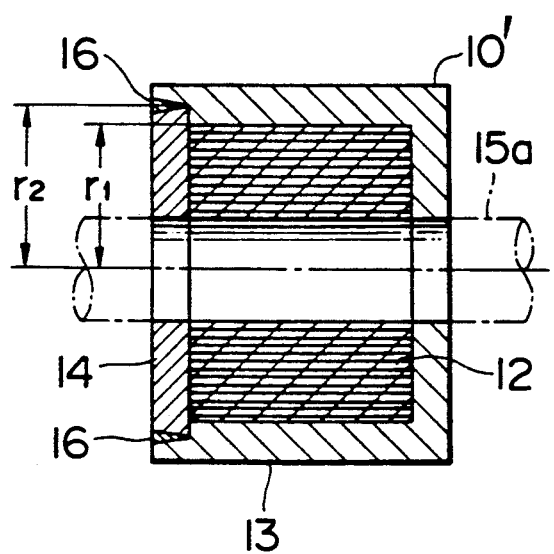

FIG. 5 shows a further embodiment in which a bottomed cylindrical reinforcement member 10' similar in structure to the cylindrical reinforcement member 10 described with reference to FIG. 3 has an open end closed by a circular end plate 14 which is welded to the reinforcement member 10' along the outer periphery of the end plate 14 as at 16. The welding was conducted by electron beam welding. The welding, however, can be conducted by any other welding method, such as YAG laser welding.

In the embodiment shown in FIG. 5, a step is formed in the inner surface of the open end portion of the cylindrical reinforcement member 10'. The circular end plate 14 has an outer diameter larger than the outer diameter of the cylindrical permanent magnet 12 and is engaged at its outer periphery with the stepped portion of the open end of the cylindrical reinforcement member 10' and then welded thereto.

As such, the radius $r_2$ of the circle along which the welding is conducted is determined to be larger than the radius $r_1$ of the cylindrical permanent magnet 12 to assure that, when the welding is conducted, the permanent magnet is prevented from being adversely thermally influenced by electron beam, laser beam, welding arc or the like. This advantageously prevents the reduction in the welding strength which would otherwise be caused due to gases produced by heated permanent magnet.

To further improve the prevention of the thermal effect to the permanent magnet, the bottomed cylindrical reinforcement member 10' and the circular end plate 14 may preferably be made of a material having a low heat conductivity, such as titanium alloy.

Figure 6:
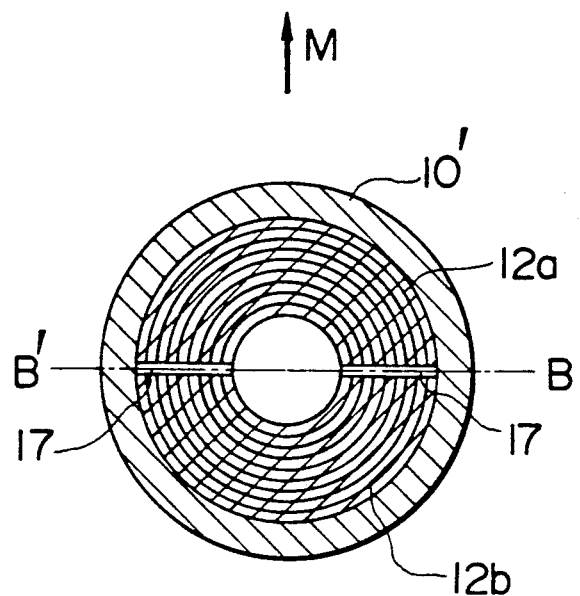
FIGS. 6 and 7 are cross-sections respectively taken along line VI—VI in FIG. 3.

The section taken along line VI—VI in FIG. 3 is shown in FIG. 6. The cylindrical permanent magnet shown in FIG. 6 is divided into two haves 12a and 12b along a plane passing through the axis of the cylindrical magnet 12. To divide the cylindrical permanent magnet is effective to prevent the magnet from being broken by centrifugal force to thereby enable the magnet to withstand a super high speed rotation.

The magnet used in this embodiment has an anisotropy in a direction indicated by an arrow M which is perpendicular to the plane along which the cylindircal magnet 12 is divided into magnet segments 12a and 12b. When this magnet is used, it is not always necessary to divide the magnet in accordance with the number of poles of the rotary machine in which the magnet is used.

The gap formed between the divided magnet segments 12a and 12b is filled with an expansible resin 17 (for example, epoxy-based elastic adhesive) by a vacuum impregnation method. The expansible and contractive characteristic of the expansible resin 17 can follow any slight change of the inner diameter of the cylindrical reinforcement member which would take place when the speed of the rotation of the rotor is varied.

Figure 7:
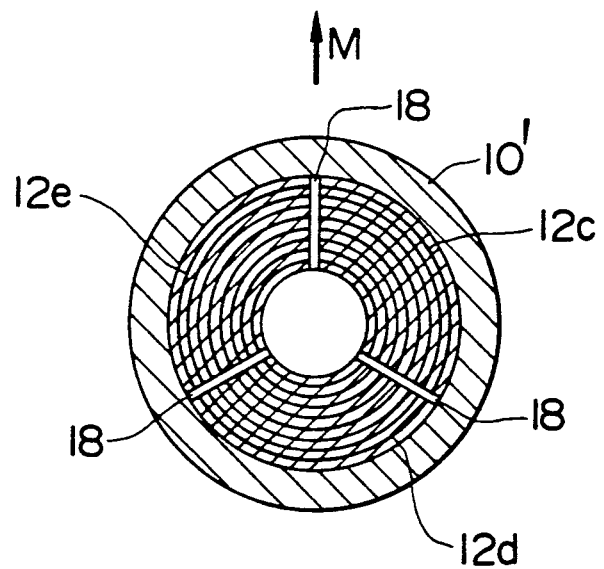

FIG. 7 shows a still further embodiment in which the cylindrical permanent magnet 12 is divided into three magnet segments 12c, 12d and 12e. The gaps between these magnet segments are filled with an expansible resin 18. This embodiment also provides an advantage similar to that obtainable from the embodiment in which the magnet is divided into two segments.

To divide a cylindrical permanent magnet into a plurality of magnet segments as described with reference to FIGS. 6 and 7 is applicable to any of the embodiments described hereinabove to more reliably assure that the rotor can withstand a super high speed rotation.

As the speed of rotation of the rotor is increased, the centrifugal stress generated in the cylindrical magnet is correspondingly increased. When the centrifugal stress exceeds the anti-breaking strength, cracks are formed in the permanent magnet until the same is broken. If the permanent magnet is so broken during the operation of the turbo-charger, an unbalanced condition will take place to cause a resonance, as discussed hereinabove, which would possibly lead to a breakdown of the turbo-charger itself.

On the other hand, in the case where the cylindrical magnet is divided into a plurality of magnet segments, the centrifugal stress generated in the magnet is smaller, even for the same speed of rotation, than in the case where the cylindrical magnet is not divided. By dividing the cylindrical magnet beforehand, therefore, it is possible to prevent the permanent magnet from being broken during a turbo-charger operation to thereby avoid the occurrence of an unbalanced condition and a resultant occurrence of resonance of the turbine shaft.

The inventors have conducted an analysis of this subject matter and found a relationship between the number of magnet pieces into which a cylindrical magnet is broken and the turbo-charger speed at which a break of the cylindrical magnet takes place.

Figure 8:
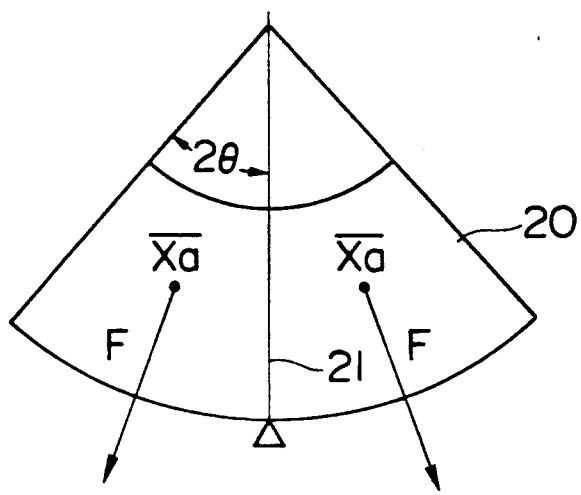
FIG. 8 is a diagrammatic illustration of a segment of the permanent magnet rotor.

A description will be made with reference to a model of a divided permanent magnet segment 20 shown in FIG. 8. A centrifugal force F acting on the magnet segment 20 is given by an equation $$F = W/g \cdot 19 \, Xa \cdot \omega^2 \qquad (1)$$

where W is the weight of a half of the magnet segment, g is the gravitational acceleration, Xa is the center of gravity of a half of the magnet segment, $$\omega, \left( = \frac{2\pi}{60} N \right).$$

is the angular velocity and N is the speed of rotation.

A force PK which acts on the central plane 21 of the magnet segment 20 can be obtained on the basis of the centrifugal force F. Assuming that the central angle of the magnet segment 20 is represented by $2\theta$, the force PK is given by an equation:

$$PK = 2F \cos(\theta) \qquad (2)$$

It is to be noted that the magnet segment 20 is broken into magnet pieces when the force acting on the central plane 21 of the magnet segment 20 exceeds the anti-breaking strength of the permanent magnet.

Figure 9:
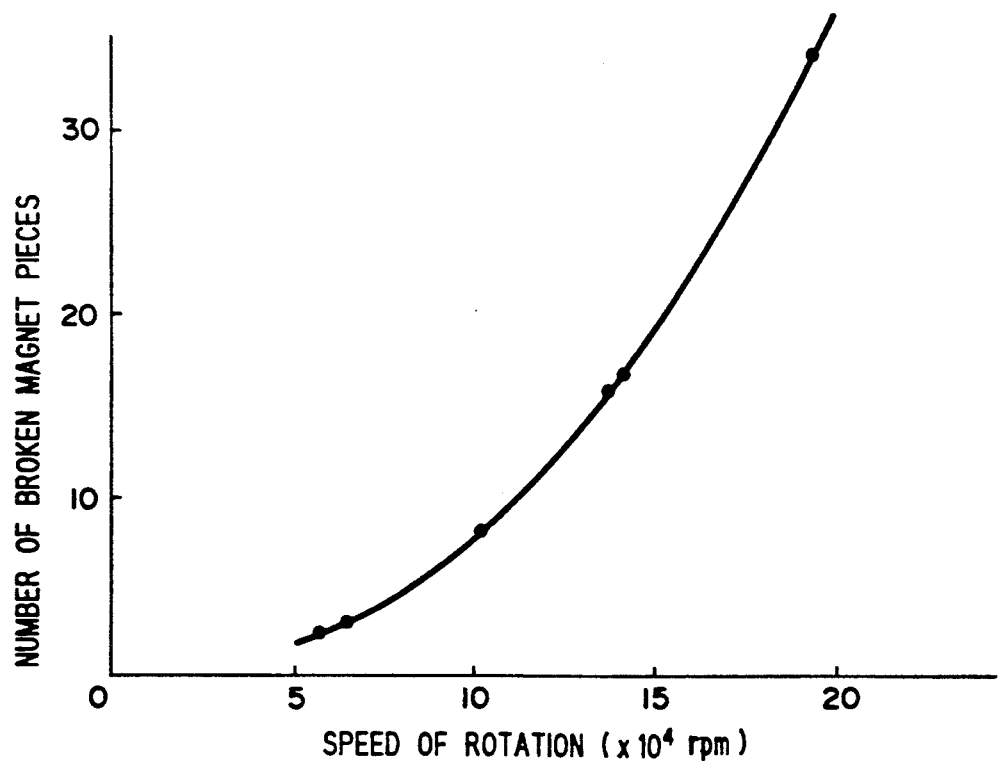
FIG. 9 is a graph showing the relationship between the number of split segments of a permanent magnet and the speed of rotation.

FIG. 9 graphically shows the relationship between the number of magnet pieces into which a permanent magnet is broken and the speed of rotation at which the break takes place. This relationship was obtained from a conventional magnet having an outer diameter of 23 mm, an inner diameter of 8 mm, a length of 16 mm, a specific gravity of $8.5 \times 10^3$ kg/m$^3$ and an anti-breaking strength of 10 kg/mm$^2$. The contents of the graph shown in FIG. 9 are ordered in a table 1 below.

TABLE 1

| Number of divided magnet pieces | Speed of rotation (RPM) |
| --- | --- |
| 4 | $7.8 \times 10^4$ |
| 8 | $10.2 \times 10^4$ |
| 16 | $13.8 \times 10^4$ |
| 32 | $19.4 \times 10^4$ |

As will be seen in the above table, if the turbo-charger is to be operated at a speed not less than 100,000 rpm, the cylindrical permanent magnet should be divided into at least eight segments. If the speed of rotation is to be increased beyond 150,000 rpm, the magnet must be divided into more than sixteen magnet segments.

It will be understood from the above description that the cylindrical permanent magnet of the rotor may preferably be divided before hand into magnet segments in accordance with a predetermined rated speed of an associated turbo-charger and then assembled with the turbo-charger to avoid the occurrence of resonance of the turbine shaft.

The most advantageous result is obtainable when the cylindrical permanent magnet is equally divided into a plurality of substantially uniform magnet segments, although an advantage to a certain extent can also be obtained even if the cylindrical permanent magnet is unequally divided into disuniform magnet segments.

To divide the cylindrical permanent magnet can be achieved by actually mounting a permanent magnet rotor on the turbo-charger and then rotating the rotor at a very high speed. Namely, after the rotor is mounted on the turbo-charger, the rotor may be rotated by the manufacturer at a speed higher than the rated speed of the turbo-charger so as to avoid the occurrence of resonance during the operation of the turbo-charger at the rated speed. It is needless to say that the same effect can be obtained by rotating only the permanent magnet rotor (namely, before the rotor is mounted on the turbo-charger at a speed higher than the rated speed.

The inventors have made a research with respect to the cylindrical reinforcement member. In general, the greater the thickness of the cylindrical reinforcement member is, the more the stress formed in the cylindrical reinforcement member is diffused. On the other hand, however, the greater the thickness of the cylindrical reinforcement member is, the greater the volume of the cylindrical reinforcement member is, with a resultant increase in the weight thereof. In consequence, the centrifugal force acting on the reinforcement member during a super high speed rtoation thereof is correspondingly increased. Thus, the stress formed in a thicker cylindrical reinforcement member is greater than in a thinner cylindrical reinforcement member.

Figure 10:
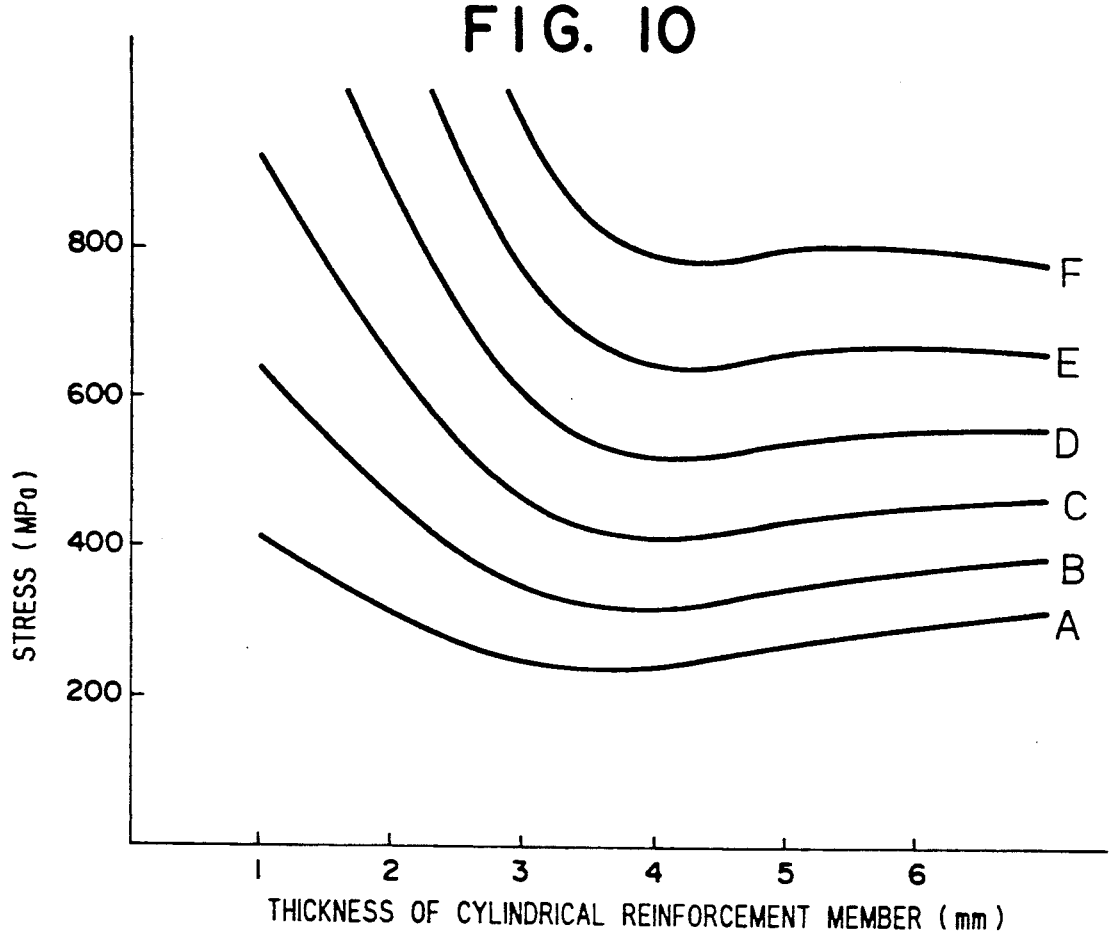
FIG. 10 is a graph showing the relationship between the stress in a cylindrical reinforcement member and the thickness thereof.

FIG. 10 graphically illustrates the relationship between the thickness of the cylindrical reinforcement member and the stress formed therein which relationship was obtained by tests. The curves A, B, C, D, E and F shown in FIG. 10 respectively show the test results from cylindrical reinforcement members for cylindrical permanent magnets having diameters of 15 mm, 17 mm, 19 mm, 21 mm, 23 mm and 25 mm.

As will be seen in FIG. 10, the curves A-F for the permanent magnets of different diameters are generally similar in shape. The research has come to the conclusion that the cylindrical reinforcement member should preferably have a thickness of 3.5 mm to 5 mm.

The break of the permanent magnet which causes a resonance of the turbine shaft will be described in detail hereunder. When the turbo-charger is rotated at a high speed, centrifugal forces act on the cylindrical reinforcement member and the permanent magnet of the rotor. Due to the centrifugal force acting on the permanent magnet, a centrifugal stress is formed in the permanent magnet. When the centrifugal stress exceeds the anti-breaking strength of the permanent magnet, a break of the magnet occurs.

The centrifugal force acting on the cylindrical reinforcement member deforms the same radially outwardly. Because the permanent magnet is supported by the cylindrical reinforcement member, the permanent magnet is also deformed radially outwardly. In general, when a cylindrical member is radially outwardly expanded, a tensile stress is formed therein. When the tensile stress in the permanent magnet is increased, cracks are formed in the magnet until the same is broken.

The strength of the permanent magnet against the tensile stress is lower as compared with the strength of the permanent magnet against the compression stress. For this reason, the permanent magnet tends to be easily broken when the magnet is subjected to a tensile stress. As compared with the strengths of steels against the tensile stress, the strength of the permanent magnet against the tensile stress is lower. When the permanent magnet is subjected to a tensile stress of, for example, from 7 to 8 kg/mm$^2$, the magnet is broken.

To reduce the tensile stress formed in the permanent magnet of the rotor during a high speed rotation thereof can be achieved by subjecting the permanent magnet to a compression stress (pre-compression stress) when the rotor is stationary, i.e., before the rotor is put in practical operation. In an actual operation of the rotor, as the speed of the rotor is increased, the cylindrical reinforcement member is gradually radially outwardly deformed and, at the same time, the tensile stress in the permanent magnet is also increased. However, if a pre-compression stress is formed in the permanent magnet, the tensile stress actually formed in the permanent magnet can be reduced by the initially formed pre-compression stress.

To subject the permanent magnet of the rotor to an initial pre-compression pressure before operation of the rotor can be achieved by setting the inner diameter of the cylindrical reinforcement member to be smaller than the outer diameter of the cylindrical permanent magnet and by forcibly inserting the permanent magnet into the cylindrical reinforcement member, i.e., by press-fitting.

In general, because permanent magnets are formed of fragile material, if the permanent magnet of the rotor is press-fitted into the cylindrical reinforcement member, the magnet is broken, with a result that an insufficient pre-compression stress is obtained. Thus, it is advisable to heat the cylindrical reinforcement member to expand the same and, thereafter, press-fit the permanent magnet into the expanded reinforcement member.

In order to conduct the press-fitting after thermal expansion of the reinforcement member, the cylindrical reinforcement member should preferably be made of a material having a high coefficient of linear expansion and a high durable temperature. In addition, because the cylindrical reinforcement member is provided around the permanent magnet, the refinforcement member should be made of a non-magnetic material. Furthermore, it has been ascertained by tests that a thermal expansion of the cylindrical reinforcement member sufficient for the press-fitting cannot be obtained unless the reinforcement member has a coefficient of thermal expansion greater than about 0.007 at the durable temperature thereof. Materials which meet this condition are, for example, austenitic heat resisting steel, which has a coefficient of thermal expansion of 0.0125 at the durable temperature, and nickel-based alloy which has a coefficient of thermal expansion of 0.0091 at the durable temperature.

Figure 11:
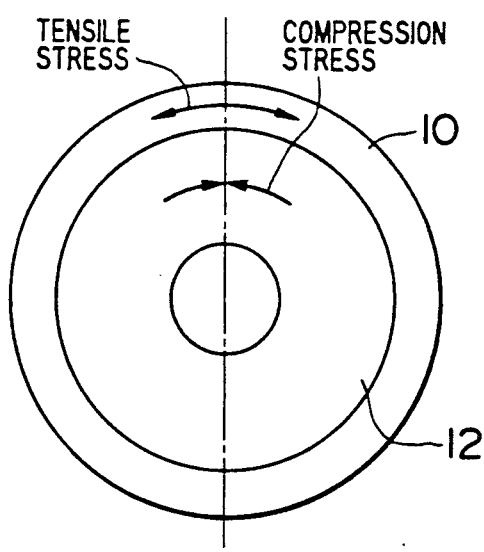
FIG. 11 diagrammatically illustrates stresses generated in the permanent magnet rotor when the permanent magnet is press-fitted into the cylindrical reinforcement member.

FIG. 11 diagrammatically illustrates the stresses in the cylindrical reinforcement member 10 and the permanent magnet 12. Because the permanent magnet 12 is press-fitted into the reinforcement member 10, the permanent magnet 12 is subjected to a compression stress, while the reinforcement member 10 is subjected to a tensile stress.

The cylindrical reinforcement member 10 and the permanent magnet should be dimensioned such that the compression stress formed in the permanent magnet when the rotor is stationary does not exceed the stress of the level at which the permanent magnet cannot withstand. On the other hand, when the rotor is rotated at a high speed, the cylindrical reinforcement member is subjected to a centrifugally generated tensile stress in addition to the initial tensile stress. Thus, the reinforcement member and the permanent magnet should be dimensioned such that the tensile stress formed in the cylindrical reinforcement member when the rotor operation reaches its rated speed does not exceed the stress of the level at which the reinforcement member cannot withstand.

Moreover, the rotor is exposed to a high temperature of the engine exhaust gases. This also should be taken into consideration in deciding the dimensions of the cylindrical reinforcement member and the permanent magnet in order to assure that the compression stress created in the permanent magnet by the press-fitting still remains therein when the rotor is subjected to a high engine exhaust gas temperature.

Figure 12:
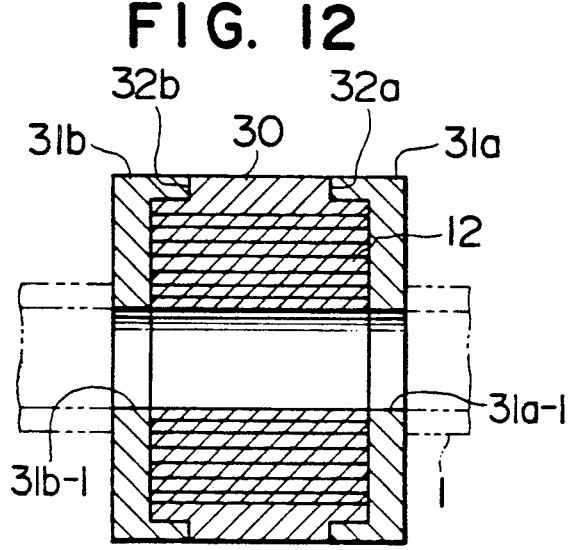
FIGS. 12–14 are axial sectional views of further embodiments of the permanent magnet rotor.

FIG. 12 shows a still further embodiment of the permanent magnet rotor for the rotary machine directly connected to a turbo-charger. The rotor is designed to have a structure suited for the press-fitting described above.

A cylindrical reinforcement member 30 is fitted over a permanent magnet 12 mounted on the turbine shaft 1. The cylindrical reinforcement member 30 has open ends closed by a pair of end plates 31a and 31b respectively having through-holes 31a-1 and 31b-1 through which the turbine shaft 1 extends. The open ends of the reinforcement member and the end plates are connected together by socket and spigot joints 32a and 32b. The socket and spigot joints are of shrink-fitting type and arranged such that the joint portions of the cylindrical reinforcement member 30 are inserted into the joint portions of the end plates 31a and 31b with an epoxy based resin applied to the joint portions. The strength at each joints 32a and 32b may preferably be increased by welding, bonding or press-fitting conducted on the outer peripheral surface of the joint.

Assuming that the cylindrical reinforcement member 30 and the right side end plate 31a are integrally fabricated to form such a bottomed reinforcement member as shown in FIG. 3, the thermal expansion of such bottomed cylindrical reinforcement member at its open end is different from that of the same reinforcement member at a portion adjacent to the bottom end. This is inconvenient to insert the permanent magnet into the bottomed cylindrical reinforcement member when it is heated.

Figure 13A:
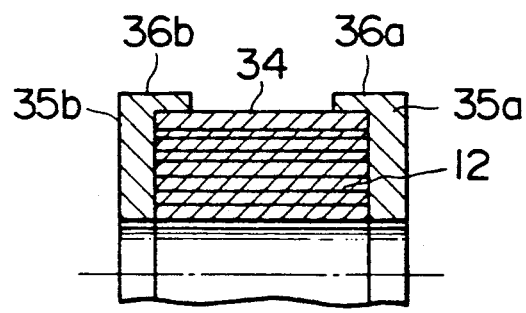

FIG. 13A shows a still further embodiment in which a cylindrical permanent magnet 12 is fitted into an open-ended cylindrical reinforcement member 34 of an axial dimension substantially the same as that of the permanent magnet 12. A pair of circular end plates 35a and 35b close the open ends of the cylindrical reinforcement member 34.

The end plates have annular projections 36a and 36b having inner diameters the same as the outer diameter of the cylindrical reinforcement member 34. The annular projections 36a and 36b are fitted over the cylindrical reinforcement member 34 and connected thereto by shrink-fitting.

Figure 13B:
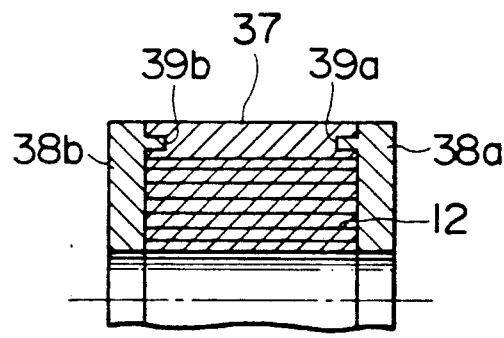

FIG. 13B shows a still further embodiment in which circular end plates 38a and 38b have annular projections 39a and 39b having outer diameters smaller than the outer diameter of a cylindrical reinforcement member 37. The inner diameters of the annular projections 39a and 39b are larger than the inner diameter of the cylindrical reinforcement member 37. These annular projections are fitted into annular grooves formed in the opposite end faces of the cylindrical reinforcement member 37 to connect the end plates 38a and 38b to the cylindrical reinforcement member 37 by shrink-fitting.

Figure 13C:
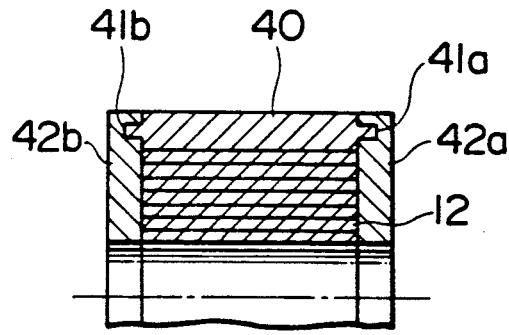

FIG. 13C shows a still further embodiment in which a cylindrical reinforcement member 40 has end faces on which annular projections 41a and 41b are formed. These projections are fitted into annular grooves formed in circular end plates 42a and 42b to connect the end plates to the cylindrical reinforcement member 40 by shrink-fitting.

Figure 14:
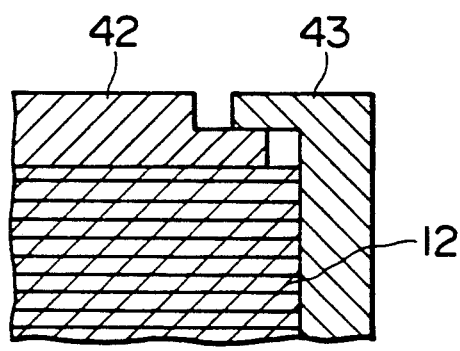

FIG. 14 shows a still further embodiment in which a cylindrical reinforcement member 42 has an axial dimension smaller than the axial dimension of the cylindrical permanent magnet 12. With this structure, the cylindrical reinforcement member 42 is connected to end plates 43 (only one of which is shown) only in the circumferential direction, while the cylindrical permanent magnet 12 is connected to the end plates 43 only in the axial direction. Accordingly, the permanent magnet 12 is axially restrained by the end plates 43, so that the permanent magnet 12 is not movable in the axial direction.

Figure 15:
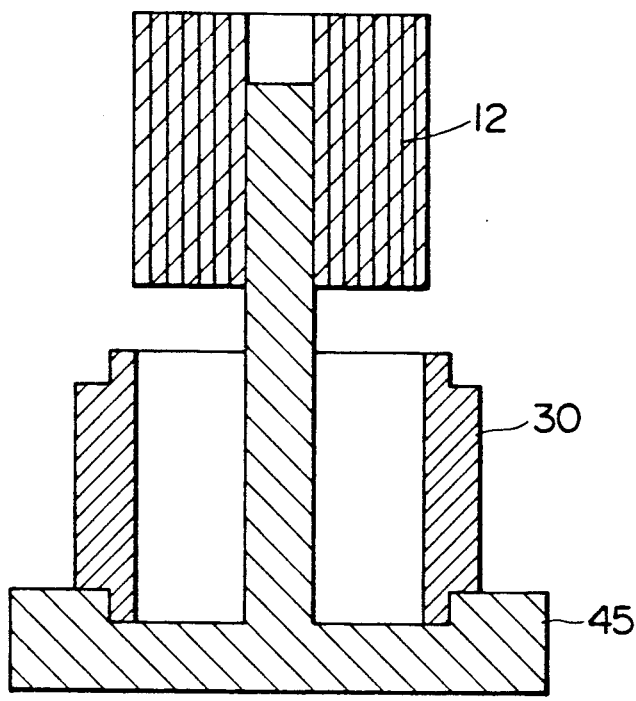
FIG. 15 shows a method of assembling the permanent magnet rotor.

FIG. 15 shows a method of press-fitting the permanent magnet 12 into the cylindrical reinforcement member 30. The reinforcement member 30 is assembled with a press-fitting jig 45 such that one of the joint portions, i.e., stepped small diameter portions, of the reinforcement member 30 is received in the jig 45. Then, the assembly is heated in a heating furnace to a temperature not higher than the durable temperature of the material from which the cylindrical reinforcement member is made. When the assembling ability and the production installation are taken into consideration, the maximum heating temperature is 800° C. Then, the thus heated assembly of the cylindrical reinforcement member 30 and the jig 45 is taken out of the heating furnace. The central axial through-hole in the cylindrical permanent magnet 12 is aligned with a central magnet guide pin of the jig 45. Then the magnet 12 is forced downwardly along the magnet guide pin until the magnet 12 is press-fitted into the cylindrical reinforcement member 30. This press-fitting method is advantageous in that the permanent magnet 12 is not stopped mid way of its press-fitting movement into the cylindrical reinforcement member 30. A stress by the press-fitting is created as the heated cylindrical reinforcement member is cooled.

The turbo-charger in operation will possibly become unbalanced as a whole if the cylindrical permanent magnet is axially movable within the cylindrical reinforcement member. In order to eliminate such axial movement of the permanent magnet within the cylindrical reinforcement member and assure a well balanced rotary field pole, the rotary machine may preferably be provided with means for offsetting the magnetic center of the stator core of the generator from the magnetic center of the rotary field pole to apply a magnetic traction force to the permanent magnet of the rotor in an axial direction. The magnetic traction force tends to axially align the magnetic center of the rotary field pole with the magnetic center of the stator core. Thus, even if any clearance is formed between the inner surface of the cylindrical reinforcement member and the permanent magnet, a thrust force acts on the permanent magnet to bias the magnet toward or against one end wall of the cylindrical reinforcement member. The magnetic traction force is also effective to moderate a radial offset to thereby improve the balance of the rotary field pole.

Figure 16:
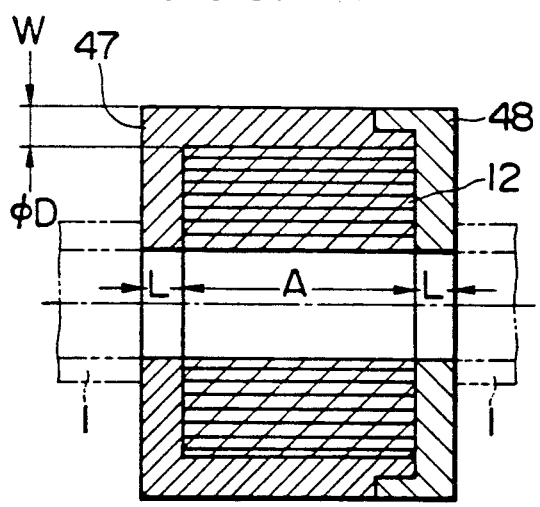
FIGS. 16–19 are axial sectional views of further embodiments of the permanent magnet rotor.

FIG. 16 shows a still further embodiment of the permanent magnet rotor to be directly connected to the turbo-charger. The rotor is formed by a permanent magnet 12, a cylindrical reinforcement member 47 fitting over the outer periphery of the permanent magnet 12 to prevent scattering of magnet pieces when the magnet 12 is broken, and an end plate 48 made of a material the same as the cylindrical reinforcement member 47 and closing one end face of the permanent magnet 12. The permanent magnet 12 is fitted into the cylindrical reinforcement member 47 with substantially no (5 μm or less) gap left therebetween and secured to the reinforcement member by an epoxy-based adhesive.

The end plate 48 is connected to the cylindrical reinforcement member 47 such that a stepped reduced diameter portion at the open end of the cylindrical reinforcement member 47 is press-fitted into annular flange or projection formed along the outer periphery of the end plate 48. The two members may alternatively be connected by welding.

In the rotor of this embodiment, the thickness of the end plate 48, over which the end plate is engaged with the turbine shaft 1, is more than $\frac{1}{8}$ of the axial dimension of the permanent magnet 12.

Figure 17:
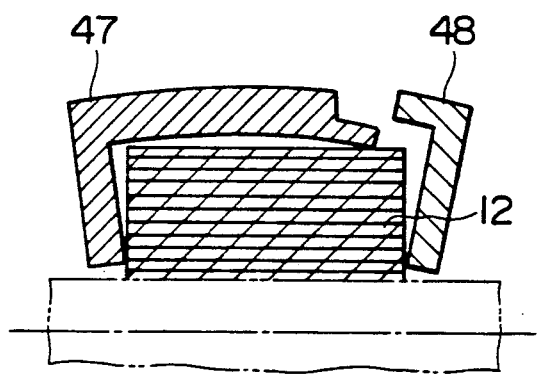

In operation, the cylindrical reinforcement member 47 around the permanent magnet 12 is considered to be integral with the end plate 48 because they are connected together. When the rotor is rotated at a high speed, the reinforcement member 47 and the end plate 48 are deformed in a manner shown in FIG. 17. The face of the end plate 48 in contact with the turbine shaft 1 is inclined relative to the peripheral surface of the shaft 1 due to a centrifugal expansive force and a force which tends to radially outwardly expand a central portion.

If the end plate were formed of a thin member, the gap between the end plate and the shaft will be so enlarged that the connection between the shaft and the end plate is lost. The connection between the rotor and the shaft in the axial direction is solely by means of fastening or clamping forces applied by nuts. Thus, the rotor will be movable relative to the shaft.

When the end plate has a predetermined thickness, the inclined deformation of the end plate due to the centrifugal force functions to decrease the gap between the end plate and the shaft to thereby avoid the occurrence of angular displacement or movement of the end plate relative to the shaft during rotation of the rotor, with a resultant advantage that increase of the unbalance caused during rotation is prevented.

When the radial thickness of the cylindrical reinforcement member 47 is determined to be 1/12 of the outer diameter of the permanent magnet 12, the reinforcement member exhibits a sufficient strength and provides a sufficient rigidity against inclination of the end plate 48 to thereby advantageously prevent the occurrence of increase of the unbalance caused during rotation.

Figure 18A:
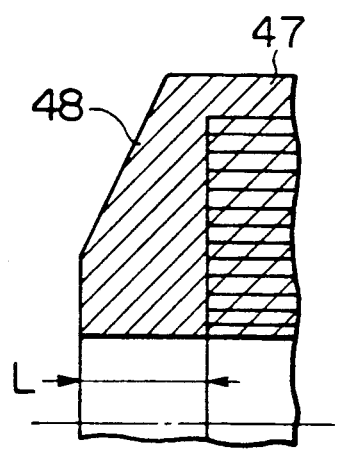
Figure 18B:
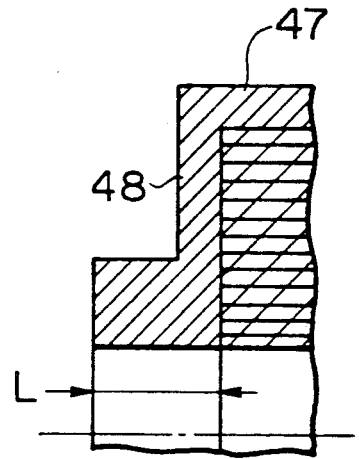
Figure 19:
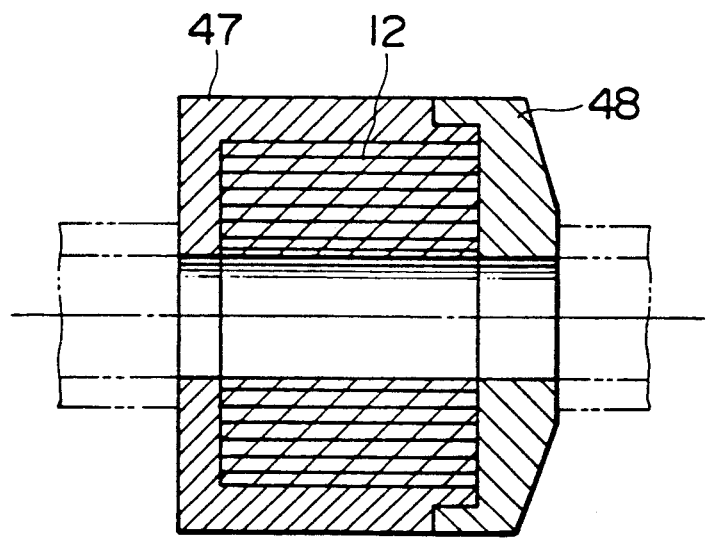

The shape of the end plate will be described hereunder with reference FIGS. 18A and 18B. Basically, the shape of the end plate 48 is determined solely by the face of the end plate disposed in contact with the turbine shaft. Namely, the end plate may be of tapered shape as shown in FIG. 18A or of stepped shape as shown in FIG. 18B. The right and left end plates may have different thicknesses. In the case where the end plate 48 is connected to a cylindrical reinforcement member 47 by a socket and spigot joint, as shown in FIG. 19, the thickness of the end plate is preferably increased to increase the area of the surface of the end plate disposed in contact with the shaft with a resultant increase in the stability of the socket and spigot joint and the strength and the rigidity of the end plate.

The structure described above provides following advantages:

The end plate having a thickness greater than $\frac{1}{8}$ of the axial dimension of the permanent magnet improves the bending rigidity of the whole of the rotor to suppress the occurrence of abnormal vibration of the shaft; and The cylindrical reinforcement member having a radial thickness greater than 1/12 of the outer diameter of the permanent magnet provides the rotor with a desired strength and improves the rigidity of the rotor to suppress the occurrence of abnormal vibration of the shaft.

Figure 20:
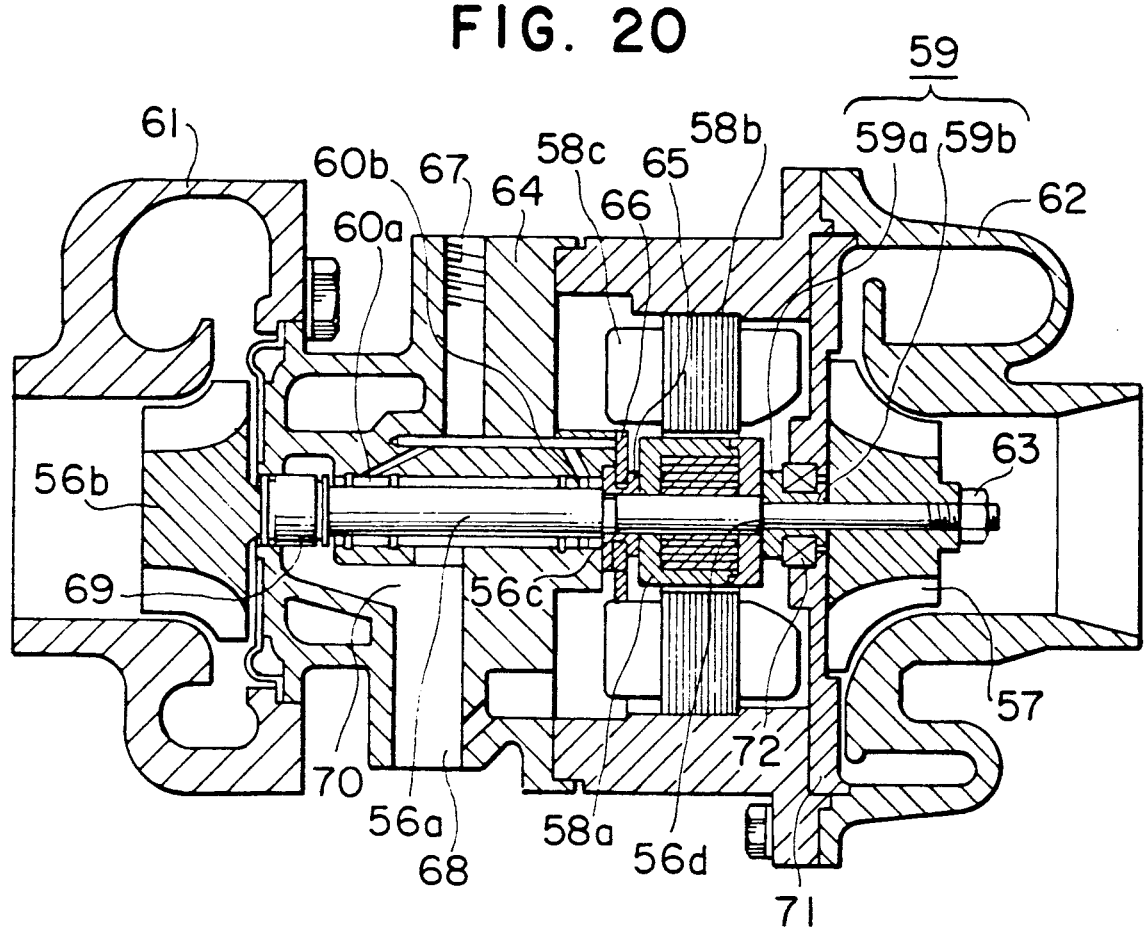
FIG. 20 is an axial sectional view of another embodiment of the turbo-charger.

FIG. 20 shows another embodiment of the turbo-charger equipped with a directly connected rotor. The turbo-charger includes a turbine impeller 56b to be rotated by engine exhaust gases. The turbine impeller is disposed in a turbine casing 61 and secured to a turbine shaft 56a. A compressor impeller 57 is disposed in a compressor casing 62 and mounted on the turbine shaft 56a for rotation therewith to forcibly feed intake air into the engine.

The outer diameter of the turbine shaft 56a is reduced stepwise toward an end of the shaft. The shaft carries a thrust collar 65, a permanent magnet rotor 58a, collars 59a and 59b and the compressor impeller 57. The component parts are mounted on the shaft in the mentioned order and tightened by a nut 63 such that the thrust collar 65 is urged against a first stepped portion 56c of the shaft and the collar 59a is urged against a second stepped portion 56d.

The turbine shaft 56a is rotatably supported by a center housing 64 through radial bearings 60a and 60b. The thrust force of the turbine shaft is transmitted to the center housing 64 via the thrust collar 65 and a thrust bearing 66 mounted on the thrust collar 65.

A rotary machine is directly connected to the turbo-charger and formed by the permanent magnet rotor 58a and a stator 58b including a stator coil 58c.

Cooling oil is fed into the turbo-charger through an oil inlet 67 formed in the center housing 64 and discharged through an oil outlet 68. The center housing 64 has formed therein an oil passage 70 which is sealed from the turbine casing 61 by a piston ring 69. The oil passage 70 in the center housing is also sealed from the compressor casing 62 by a mechanical seal 72 supported by a back plate 71.

The cooling oil is fed to the radial bearings 60a and 60b and to the thrust bearing 66. The cooling oil not only acts as a lubricant but also functions to block the transfer of heat generated within the turbing casing 61 to other sections of the turbo-charger. The cooling oil further flows to the permanent magnet rotor 58a and the stator 58b and is circulated to cool the stator 58b.

The thrust bearing 66 is disposed radially inwardly of the stator 58b and does not extend axially outwardly of the stator 58b to advantageously realize a compact design of the turbo-charger in its entirety.

Figure 21:
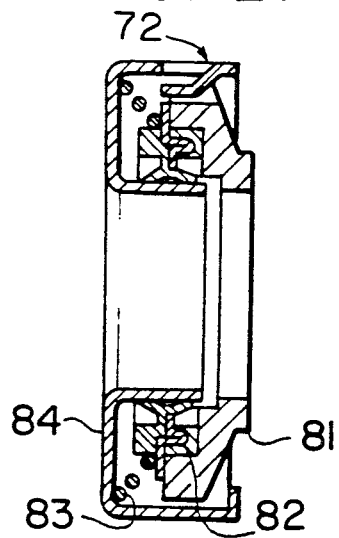
FIG. 21 is an axial sectional view of a mechanical seal in the turbo-charger shown in FIG. 20.

FIG. 21 shows details of the mechanical seal 72. The mechanical seal 72 comprises a seal ring 81, a packing 82, a spring 83 and a casing 84 which is press-fitted into a hole in the back plate 71. The seal ring 81 has a sealing face disposed in sliding sealing engagement with the collar 59b. The spring 83 resiliently biases the seal ring 81 to prevent the occurrence of a disuniform or uneven sliding sealing engagement of the seal ring which would otherwise be caused by vibration of the turbine shaft 56a. The mechanical seal 72 is operative to seal the compressor casing 62 from the oil passages formed in the center housing 64.

What is claimed is:

1. A turbo-charger for an internal combustion engine, comprising:
   a turbine driven by engine exhaust gases;
   a turbine shaft fixed to said turbine;
   a compressor secured to said turbine shaft and driven thereby to forcibly feed air into the engine;
   a substantially cylindrical permanent magnet provided around said turbine shaft;
   a stator disposed in an opposed relationship to said permanent magnet;
   a substantially cylindrical reinforcement member of a nonmagnetic material, said cylindrical permanent magnet being disposed in said reinforcement member so as to surround an outer periphery of said permanent magnet;
   at least one end plate of a nonmagnetic material; and
   interlocking joint means for connecting said at least one end plate to an open end of said cylindrical reinforcement member in such a manner that said end plate covers an adjacent end face of said permanent magnet so as to prevent a deformation of said reinforcement member.

2. A turbo-charger according to claim 1, wherein said cylindrical reinforcement member comprises a substantially cylindrical section having an end wall integral therewith forming a bottom portion of the member, said end wall is disposed axially opposite to said open end.

3. A turbo-charger for an internal combustion engine, comprising:
   a turbine driven by engine exhaust gases;
   a turbine shaft fixed to said turbine;
   a compressor secured to said turbine shaft and driven thereby to forcibly feed air into the engine;
   a substantially cylindrical permanent magnet provided around said turbine shaft;
   a stator disposed in an opposed relationship to said permanent magnet;
   a substantially cylindrical reinforcement member of a nonmagnetic material fitted onto said cylindrical permanent magnet to surround an outer periphery thereof, said cylindrical reinforcement magnet having open ends; and
   a pair of end plates, each of said end plates is connected to one of said open ends such that each of said end plates radially inwardly supports an outer periphery of one of said open ends.

4. A turbo-charger according to claim 3, wherein each of said end plates has an inwardly directed annular projection disposed adjacent to an outer periphery thereof and fixed to and radially supporting a corresponding one of said open ends of said cylindrical reinforcement member.

5. A turbo-charger according to claim 3, wherein each of said end plates has an axially projecting annular projection disposed adjacent to an outer periphery thereof, an annular groove is formed in an end face of each of said open ends of said cylindrical reinforcement member, and the annular projections are respectively engaged in corresponding annular grooves to radially support said reinforcement member.

6. A turbo-charger according to claim 3, wherein an annular groove is formed in each of said end plates adjacent to an outer periphery thereof and said cylindrical reinforcement member has an annular projection disposed adjacent to each of said open ends thereof and respectively engaged in corresponding annular grooves to radially support said reinforcement member.

7. A turbo-charger for an internal combustion engine, comprising:
   a turbine driven by engine exhaust gases;
   a turbine shaft fixed to said turbine;
   a compressor secured to said turbine shaft and driven thereby to forcibly feed air into the engine;
   a substantially cylindrical permanent magnet provided around said turbine shaft;
   a stator disposed in an opposed relationship to said permanent magnet;
   a substantially cylindrical reinforcement member of a nonmagnetic material fitted onto said cylindrical permanent magnet to surround an outer periphery thereof, said cylindrical reinforcement member comprises longer and shorter substantially cylindrical sections divided along a plane perpendicular to an axis of said cylindrical reinforcement member, and
   wherein each of said at longer and shorter cylindrical sections includes an integral end plate and an open end axially opposite to said end plate, the open ends of said longer and shorter cylindrical sections are connected together such that the open end of said shorter cylindrical section radially inwardly supports an outer periphery of the open end of said longer cylindrical section.

8. A turbo-charger for an internal combustion engine, comprising:
   a turbine driven by engine exhaust gases;
   a turbine shaft fixed to said turbine;
   a compressor secured to said turbine shaft and driven thereby to forcibly feed air into the engine;
   a substantially cylindrical permanent magnet driven by said turbine shaft, wherein said permanent magnet is divided in a rotational direction of said permanent magnet into more than eight magnet segments when said turbine shaft is adapted to be rotated at a rated speed higher than 100,000 rpm;
   a stator disposed around said permanent magnet in spaced relationship thereto; and
   a substantially cylindrical reinforcement member provided around said cylindrical permanent magnet.

9. A turbo-charger for an internal combustion engine, comprising:
   a turbine driven by engine exhaust gases;
   a turbine shaft fixed to said turbine;
   a compressor secured to said turbine shaft and driven thereby to forcibly feed air into the engine;
   a substantially cylindrical permanent magnet driven by said turbine shaft, wherein said permanent magnet is divided in a rotational direction of said permanent magnet into more than sixteen magnet segments when said turbine shaft is adapted to be rotated at a rated speed higher than 150,000 rpm;
   a stator disposed around said permanent magnet in spaced relationship thereto; and
   a substantially cylindrical reinforcement member provided around said cylindrical permanent magnet.

10. A turbo-charger for an internal combustion engine, comprising:
    a turbine driven by engine exhaust gases;
    a turbine shaft fixed to said turbine;
    a compressor secured to said turbine shaft and driven thereby to forcibly feed air into the engine;
    a substantially cylindrical permanent magnet driven by said turbine shaft;

a stator disposed in opposed relationship to said permanent magnet; and a substantially cylindrical reinforcement member provided around said cylindrical permanent magnet;

said cylindrical reinforcement member having a thickness ranging from 3.5 mm to 5 mm.

11. A turbo-charger for an internal combustion engine, comprising:

a turbine driven by engine exhaust gases;

a turbine shaft fixed to said turbine;

a compressor secured to said turbine shaft and driven thereby to forcibly feed air into the engine;

a substantially cylindrical permanent magnet provided around said turbine shaft;

a stator disposed in opposed relationship to said permanent magnet;

a substantially cylindrical reinforcement member of a nonmagnetic material fitted onto said cylindrical permanent magnet to surround an outer periphery thereof; and at least one end plate of a non-magnetic material connected to an open end of said cylindrical reinforcement member such that said end plate covers an adjacent end face of said permanent magnet and is arranged to prevent a deformation of said reinforcement member, said end plate has an inwardly directed annular projection disposed adjacent to an outer periphery of said end plate and fixed to and radially supporting said open end of said cylindrical reinforcement member.

12. A turbo-charger for an internal combustion engine, comprising:

a turbine driven by engine exhaust gases;

a turbine shaft fixed to said turbine;

a compressor secured to said turbine shaft and driven thereby to forcibly feed air into the engine;

a substantially cylindrical permanent magnet provided around said turbine shaft;

a stator disposed in opposed relationship to said permanent magnet;

a substantially cylindrical reinforcement member of a nonmagnetic material fitted onto said cylindrical permanent magnet to surround an outer periphery thereof; and at least one end plate of a non-magnetic material connected to an open end of said cylindrical reinforcement member such that said end plate covers an adjacent end face of said permanent magnet and is arranged to prevent a deformation of said reinforcement member, said end plate has an axially projecting annular projection disposed adjacent to an outer periphery of said end plate, an annular groove is formed in an end face of said open end of said cylindrical reinforcement member, and said annular projection is engaged in said annular groove to radially support said reinforcement member.

13. A turbo-charger for an internal combustion engine, comprising:

a turbine driven by engine exhaust gases;

a turbine shaft fixed to said turbine;

a compressor secured to said turbine shaft and driven thereby to forcibly feed air into the engine;

a substantially cylindrical permanent magnet provided around said turbine shaft;

a stator disposed in opposed relationship to said permanent magnet;

a substantially cylindrical reinforcement member of a nonmagnetic material fitted onto said cylindrical permanent magnet to surround an outer periphery thereof;

at least one end plate of a non-magnetic material connected to an open end of said cylindrical reinforcement member such that said end plate covers an adjacent end face of said permanent magnet and is arranged to prevent a deformation of said reinforcement member; and an annular groove formed in said end plate adjacent to an outer periphery thereof, and wherein said cylindrical reinforcement member has an annular projection disposed adjacent to said open end thereof and engaged in said annular groove to radially support said reinforcement member.

* * * * *

UNITED STATES PATENT AND TRADEMARK OFFICE
CERTIFICATE OF CORRECTION

PATENT NO. : 5,121,605
DATED : June 16, 1992
INVENTOR(S) : Oda, et. al.

It is certified that error appears in the above-identified patent and that said Letters Patent is hereby corrected as shown below:

On the Title page, item [73], Assignee should read--Hitachi, Ltd. Tokyo, Japan and Hitachi Automotive Engineering Co., Ltd., Ibaraki-Ken, Japan--.

Signed and Sealed this

Thirtieth Day of November, 1993

Attest:

BRUCE LEHMAN

*Attesting Officer*

*Commissioner of Patents and Trademarks*